United States Patent
Frolikov

(10) Patent No.: US 11,157,173 B2
(45) Date of Patent: *Oct. 26, 2021

(54) NAMESPACE MANAGEMENT IN NON-VOLATILE MEMORY DEVICES

(71) Applicant: Micron Technology, Inc., Boise, ID (US)

(72) Inventor: Alex Frolikov, San Jose, CA (US)

(73) Assignee: Micron Technology, Inc., Boise, ID (US)

(*) Notice: Subject to any disclaimer, the term of this patent is extended or adjusted under 35 U.S.C. 154(b) by 42 days.

This patent is subject to a terminal disclaimer.

(21) Appl. No.: 16/535,728

(22) Filed: Aug. 8, 2019

(65) Prior Publication Data

US 2019/0361610 A1 Nov. 28, 2019

Related U.S. Application Data

(63) Continuation of application No. 15/790,979, filed on Oct. 23, 2017, now Pat. No. 10,503,404.

(51) Int. Cl.
*G06F 3/06* (2006.01)
*G06F 12/02* (2006.01)
*G06F 13/42* (2006.01)

(52) U.S. Cl.
CPC .......... *G06F 3/0608* (2013.01); *G06F 3/0604* (2013.01); *G06F 3/0607* (2013.01); *G06F 3/0631* (2013.01); *G06F 3/0652* (2013.01); *G06F 3/0673* (2013.01); *G06F 3/0688* (2013.01); *G06F 12/0246* (2013.01); *G06F 13/4282* (2013.01); *G06F 2212/7201* (2013.01); *G06F 2213/0026* (2013.01)

(58) Field of Classification Search
CPC .... G06F 3/0608; G06F 3/0604; G06F 3/0607; G06F 3/0631; G06F 3/0652; G06F 3/0673; G06F 3/0688; G06F 2212/7201
See application file for complete search history.

(56) References Cited

U.S. PATENT DOCUMENTS 5,430,856 A 7/1995 Kinoshita
6,529,921 B1 3/2003 Berkowitz et al.
(Continued)

OTHER PUBLICATIONS

B. Luo, X. Zhang and Z. Tan, "Metadata Namespace Management of Distributed File System," 2015 14th International Symposium on Distributed Computing and Applications for Business Engineering and Science (DCABES), Guiyang, 2015, pp. 21-25, doi: 10.1109/DCABES.2015.13. (Year: 2015).*

(Continued)

*Primary Examiner* — Khoa D Doan
(74) *Attorney, Agent, or Firm* — Greenberg Traurig

(57) ABSTRACT

A computer storage device having: a host interface; a controller; non-volatile storage media; and firmware. The firmware instructs the controller to: divide a contiguous logical address capacity into blocks according to a predetermined block size; and maintain a data structure to identify: free blocks are available for allocation to new namespaces; and blocks that have been allocated to namespaces in use. Based on the content of the data structure, non-contiguous blocks can be allocated to a namespace; and logical addresses in the namespace can be translated to physical addresses for addressing the non-volatile storage media of the storage device.

20 Claims, 4 Drawing Sheets

(56) References Cited

U.S. PATENT DOCUMENTS

| | | | |
|---|---|---|---|
| 7,509,473 | B2 | 3/2009 | Horn et al. |
| 7,904,636 | B2 | 3/2011 | Wu |
| 8,498,417 | B1 | 7/2013 | Harwood et al. |
| 8,738,621 | B2 | 5/2014 | Hinrichs |
| 8,862,590 | B2 | 10/2014 | Sheehan |
| 9,116,904 | B2 | 8/2015 | Christiansen et al. |
| 9,430,480 | B1 | 8/2016 | Bono |
| 9,501,392 | B1 | 11/2016 | Weingarten |
| 9,529,735 | B2 | 12/2016 | Hashimoto |
| 10,223,254 | B1 | 3/2019 | Frolikov |
| 10,275,361 | B2 * | 4/2019 | Ish ................. G06F 12/0246 |
| 10,437,476 | B2 | 10/2019 | Frolikov |
| 10,503,404 | B2 | 12/2019 | Frolikov |
| 10,642,488 | B2 | 5/2020 | Frolikov |
| 10,678,703 | B2 | 6/2020 | Frolikov |
| 2004/0236924 | A1 | 11/2004 | Johnson et al. |
| 2005/0108269 | A1 | 5/2005 | Szajdecki et al. |
| 2006/0020745 | A1 | 1/2006 | Conley et al. |
| 2008/0109662 | A1 | 5/2008 | Natarajan et al. |
| 2009/0007162 | A1 | 1/2009 | Sheehan |
| 2009/0092252 | A1 | 4/2009 | Noll et al. |
| 2009/0198899 | A1 | 8/2009 | Revanuru |
| 2010/0036889 | A1 | 2/2010 | Joshi et al. |
| 2010/0095057 | A1 | 4/2010 | Li et al. |
| 2010/0191779 | A1 | 7/2010 | Hinrichs |
| 2010/0262583 | A1 | 10/2010 | Ingen et al. |
| 2010/0268872 | A1 | 10/2010 | Lee et al. |
| 2010/0318760 | A1 | 12/2010 | So et al. |
| 2011/0022566 | A1 | 1/2011 | Beaverson et al. |
| 2011/0106771 | A1 | 5/2011 | McDonald et al. |
| 2012/0272037 | A1 | 10/2012 | Bayer et al. |
| 2013/0080732 | A1 | 3/2013 | Nellans et al. |
| 2014/0280392 | A1 | 9/2014 | Christiansen et al. |
| 2014/0281040 | A1 | 9/2014 | Liu |
| 2014/0310499 | A1 | 10/2014 | Sundararaman et al. |
| 2015/0012538 | A1 | 1/2015 | Sheehan |
| 2015/0242309 | A1 | 8/2015 | Talagala et al. |
| 2015/0278397 | A1 | 10/2015 | Hendrickson et al. |
| 2015/0319243 | A1 | 11/2015 | Hussain et al. |
| 2016/0062885 | A1 | 3/2016 | Ryu |
| 2016/0124843 | A1 | 5/2016 | Kanno |
| 2016/0283125 | A1 | 9/2016 | Hashimoto et al. |
| 2016/0342463 | A1 | 11/2016 | Oshima |
| 2017/0024137 | A1 | 1/2017 | Kanno |
| 2017/0149924 | A1 | 5/2017 | Peterson et al. |
| 2017/0242617 | A1 | 8/2017 | Walsh et al. |
| 2017/0262175 | A1 | 9/2017 | Kanno |
| 2017/0344430 | A1 | 11/2017 | Greer et al. |
| 2017/0351431 | A1 | 12/2017 | Dewitt et al. |
| 2018/0018917 | A1 | 1/2018 | Yoo et al. |
| 2018/0024920 | A1 | 1/2018 | Thomas et al. |
| 2018/0088805 | A1 | 3/2018 | Kanno |
| 2018/0088811 | A1 | 3/2018 | Kanno |
| 2018/0089101 | A1 | 3/2018 | Sternberg et al. |
| 2018/0121344 | A1 * | 5/2018 | Seo .................. G06F 12/0246 |
| 2018/0239697 | A1 | 8/2018 | Huang et al. |
| 2018/0260319 | A1 | 9/2018 | Thompson et al. |
| 2018/0260334 | A1 | 9/2018 | Asano et al. |
| 2018/0275871 | A1 | 9/2018 | Ptak |
| 2018/0275873 | A1 | 9/2018 | Frid et al. |
| 2019/0121543 | A1 | 4/2019 | Frolikov |
| 2019/0121547 | A1 | 4/2019 | Frolikov |
| 2019/0121548 | A1 | 4/2019 | Frolikov |
| 2019/0146907 | A1 | 5/2019 | Frolikov |
| 2019/0146912 | A1 | 5/2019 | Frolikov |
| 2019/0146927 | A1 | 5/2019 | Frolikov |
| 2019/0146931 | A1 | 5/2019 | Frolikov |
| 2019/0347010 | A1 | 11/2019 | Frolikov |
| 2020/0257449 | A1 | 8/2020 | Frolikov |
| 2020/0278933 | A1 | 9/2020 | Frolikov |

OTHER PUBLICATIONS

NVM Express Base Specification Revision 1.3, May 1, 2017 (Year: 2017).*

Namespace Management in Non-Volative Memory Devices, U.S. Appl. No. 15/790,979, filed Oct. 23, 2017, Alex Frolikov, Patented Case, Nov. 20, 2019.

Namespaces Allocation in Non-Volatile Memory Devices, U.S. Appl. No. 15/790,882, filed Oct. 23, 2017, Alex Frolikov, Patented Case, Sep. 18, 2019.

Namespaces Allocation in Non-Volatile Memory Devices, U.S. Appl. No. 16/520,204, filed Jul. 23, 2019, Alex Frolikov, Docketed New Case—Ready for Examination, Aug. 23, 2019.

Namespace Change Propogation in Non-Volatile Memory Devices, U.S. Appl. No. 15/814,634, filed Nov. 16, 2017, Alex Frolikov, Patented Case, Feb. 13, 2019.

Namespace Change Propagation in Non-Volatile Memory Devices, U.S. Appl. No. 16/236,897, filed Dec. 31, 2018, Alex Frolikov, Docketed New Case—Ready for Examination, Mar. 8, 2019.

Namespace Size Adjustment in Non-Volatile Memory Devices, U.S. Appl. No. 15/790,969, filed Oct. 23, 2017, Alex Frolikov, Patented Case, Apr. 15, 2020.

Namespace Size Adjustment in Non-Volatile Memory Devices, U.S. Appl. No. 16/859,800, filed Apr. 27, 2020, Alex Frolikov, Docketed New Case—Ready for Examination, May 26, 2020.

Namespace Encryption in Non-Volatile Memory Devices, U.S. Appl. No. 15/814,679, filed Nov. 16, 2017, Alex Frolikov, Docketed New Case—Ready for Examination, Jan. 12, 2018.

Namespace Mapping Optimization in Non-Volatile Memory Devices, U.S. Appl. No. 15/814,785, filed Nov. 16, 2017, Alex Frolikov, Non Final Action Counted, Not Yet Mailed, Jul. 22, 2019.

Namespace Mapping Structural Adjustment in Non-Volatile Memory Devices, U.S. Appl. No. 15/814,934, filed Nov. 16, 2017, Alex Frolikov, Patented Case, May 20, 2020.

Namespace Mapping Structural Adjustment in Non-Volatile Memory Devices, U.S. Appl. No. 16/878,383, filed May 19, 2020, Alex Frolikov, Application Dispatched from Preexam, Not Yet Docketed, May 28, 2020.

Namespace Management in Non-Volatile Memory Devices, U.S. Appl. No. 15/790,979, filed Oct. 23, 2017, Alex Frolikov, Patented Case, Nov. 20, 2019.

Namespace Size Adjustment in Non-Volatile Memory Devices, U.S. Appl. No. 16/859,800, filed Apr. 27, 2020, Alex Frolikov, Application Dispatched from Preexam, Not Yet Docketed, May 4, 2020.

Namespace Mapping Optimization in Non-Volatile Memory Devices, U.S. Appl. No. 15/814,785, filed Nov. 16, 2017, Alex Frolikov, Docketed New Case—Ready for Examination, Dec. 20, 2017.

Namespace Structural Adjustment in Non-Volatile Memory Devices, U.S. Appl. No. 15/814,934, filed Nov. 16, 2017, Alex Frolikov, Awaiting TC Resp, Issue Fee Payment Verified, Apr. 24, 2020.

Namespace Management in Non-volatile Memory Devices, U.S. Appl. No. 15/790,979, filed Oct. 23, 2017, Alex Frolikov, Docketed New Case—Ready for Examination, Nov. 26, 2017.

Namespaces Allocation in Non-volatile Memory Devices, U.S. Appl. No. 15/790,882, filed Oct. 23, 2017, Alex Frolikov, Docketed New Case—Ready for Examination, Nov. 26, 2017.

Namespaces Allocation in Non-volatile Memory Devices, U.S. Appl. No. 16/520,204, Alex Frolikov, Application Undergoing Preexam Processing, Jul. 23, 2019.

Namespace Change Propagation in Non-volatile Memory Devices, U.S. Appl. No. 15/814,634, filed Nov. 16, 2017, Alex Frolikov, U.S. Pat. No. 1,022,3254, Mar. 5, 2019.

Namespace Size Adjustment in Non-volatile Memory Devices, U.S. Appl. No. 15/790,969, filed Oct. 23, 2017, Alex Frolikov, Docketed New Case—Ready for Examination, Aug. 7, 2019.

Namespace Mapping Structural Adjustment in Non-volatile Memory Devices, U.S. Appl. No. 15/814,934, filed Nov. 16, 2017, Alex Frolikov, Non Final Action Mailed, Oct. 26, 2018.

Dave Mintum, J. Metz, "Under the Hood with NVMe over Fabrics", Dec. 15, 2015.

Hermann Strass, "An Introduction to NVMe", copyrighted 2016.

International Search Report and Written Opinion, Int. App. No. PCT/US2018/056076, dated Jan. 30, 2019.

(56) References Cited

OTHER PUBLICATIONS

International Search Report and Written Optinion, Int. Pat. App. Ser. PCT/US2018/059377, dated Feb. 21, 2019.
J. Metz, Creating Higher Performance Solid State Storage with Non-Volatile Memory Express (NVMe), SNIA, Data Storage Innovation Conference, 2015.
Kevin Marks, "An NVM Express Tutorial", Flash Memory Summit 2013, created on Aug. 7, 2013.
NVM Express, Revision 1.2, Nov. 3, 2014.

* cited by examiner

NAMESPACE MANAGEMENT IN NON-VOLATILE MEMORY DEVICES

RELATED APPLICATIONS

The present application is a continuation of U.S. patent application Ser. No. 15/790,979, filed Oct. 23, 2017, issued as U.S. Pat. No. 10,503,404 on Dec. 10, 2019 and entitled "Namespace Management in Non-Volatile Memory Devices," the entire disclosure of which application is hereby incorporated herein by reference.

FIELD OF THE TECHNOLOGY

At least some embodiments disclosed herein relate to computer storage devices in general and more particularly, but not limited to namespace management in non-volatile storage devices.

BACKGROUND

Typical computer storage devices, such as hard disk drives (HDDs), solid state drives (SSDs), and hybrid drives, have controllers that receive data access requests from host computers and perform programmed computing tasks to implement the requests in ways that may be specific to the media and structure configured in the storage devices, such as rigid rotating disks coated with magnetic material in the hard disk drives, integrated circuits having memory cells in solid state drives, and both in hybrid drives.

A standardized logical device interface protocol allows a host computer to address a computer storage device in a way independent from the specific media implementation of the storage device.

For example, Non-Volatile Memory Host Controller Interface Specification (NVMHCI), also known as NVM Express (NVMe), specifies the logical device interface protocol for accessing non-volatile storage devices via a Peripheral Component Interconnect Express (PCI Express or PCIe) bus.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
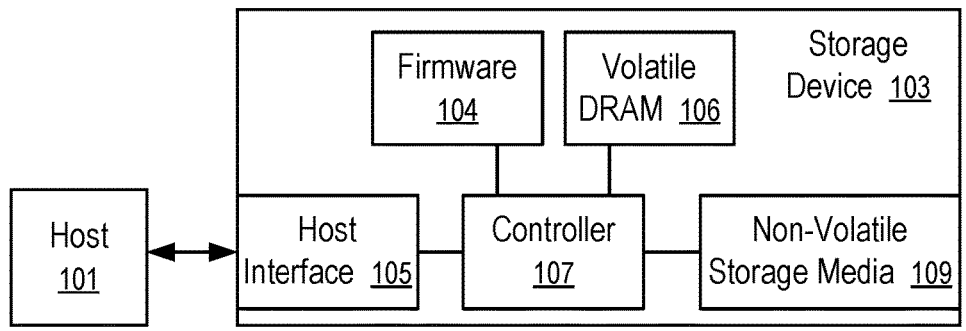
FIG. 1 shows a computer system in which embodiments of inventions disclosed herein can be implemented.

At least some embodiments disclosed herein provide efficient and flexible ways to implement logical storage allocations and management in storage devices.

Physical memory elements of a storage device can be arranged as logical memory blocks addressed via Logical Block Addressing (LBA). A logical memory block is the smallest LBA addressable memory unit; and each LBA address identifies a single logical memory block that can be mapped to a particular physical address of a memory unit in the storage device.

The concept of namespace for storage device is similar to the concept of partition in a hard disk drive for creating logical storages. Different portions of a storage device can be allocated to different namespaces and thus can have LBA addresses configured independently from each other within their respective namespaces. Each namespace identifies a quantity of memory of the storage device addressable via LBA. A same LBA address can be used in different namespaces to identify different memory units in different portions of the storage device. For example, a first namespace allocated on a first portion of the storage device having n memory units can have LBA addresses ranging from 0 to n−1; and a second namespace allocated on a second portion of the storage device having m memory units can have LBA addresses ranging from 0 to m−1.

A host computer of the storage device may send a request to the storage device for the creation, deletion, or reservation of a namespace. After a portion of the storage capacity of the storage device is allocated to a namespace, an LBA address in the respective namespace logically represents a particular memory unit in the storage media, although the particular memory unit logically represented by the LBA address in the namespace may physically correspond to different memory units at different time instances (e.g., as in SSDs).

There are challenges in efficiently implementing the mapping of LBA addresses defined in multiple namespaces into physical memory elements in the storage device and in efficiently using the storage capacity of the storage device, especially when it is desirable to dynamically allocate, delete and further allocate on the storage device multiple namespaces with different, varying sizes. For example, the portion of the storage capacity allocated to a deleted namespace may not be sufficient to accommodate the allocation of a subsequent namespace that has a size larger than the deleted namespace; and repeated cycles of allocation and deletion may lead to fragmentation of the storage capacity that may lead to inefficient mapping of LBA addresses to physical addresses and/or inefficient usage of the fragmented storage capacity of the storage device.

At least some embodiments of the inventions disclosed herein address the challenges through a block by block map from LBA addresses defined in allocated namespaces to LBA addresses defined on the entire storage capacity of the storage device. After mapping the LBA addresses defined in allocated namespaces into the LBA addresses defined on the entire storage capacity of the storage device, the corresponding LBA addresses defined on the entire storage capacity of the storage device can be further mapped to the physical storage elements in a way independent of the allocations of namespaces on the device. When the block by block mapping of LBA addresses is based on a predetermined size block size, an efficient data structure can be used for the efficient computation of LBA addresses defined on the entire storage capacity of the storage device from the LBA addresses defined in the allocated namespaces.

For example, the entire storage capacity of the storage device can be divided into blocks of LBA addresses according to a predetermined block size for flexibility and efficiency in namespace management. The block size represents the number of LBA addresses in a block. A block of the predetermined block size may be referred to hereafter as an L-block, a full L-block, a full LBA block, an LBA block, or sometimes simply as a full block or a block. The block by block namespace mapping from LBA addresses defined in allocated namespaces to LBA addresses defined on the entire storage capacity of the storage device allows the allocation of non-contiguous LBA addresses defined on the entire storage to a namespace, which can reduce fragmentation of the storage capacity caused by cycles of namespace allocation and deletion and improve efficiency in the usage of the storage capacity.

Preferably, the block size of L-blocks is predetermined and is a power of two (2) to simplify computations involved in mapping of addresses for the L-blocks. In other instances, an optimized block size may be predicted or calculated, using an artificial intelligence technique, through machine learning from the namespace usage histories in the storage device and/or other similarly used storage devices.

FIG. 1 shows a computer system in which embodiments of inventions disclosed herein can be implemented.

In FIG. 1, a host (101) communicates with a storage device (103) via a communication channel having a predetermined protocol. The host (101) can be a computer having one or more Central Processing Units (CPUs) to which computer peripheral devices, such as the storage device (103), may be attached via an interconnect, such as a computer bus (e.g., Peripheral Component Interconnect (PCI), PCI eXtended (PCI-X), PCI Express (PCIe)), a communication portion, and/or a computer network.

The computer storage device (103) can be used to store data for the host (101). Examples of computer storage devices in general include hard disk drives (HDDs), solid state drives (SSDs), flash memory, dynamic random-access memory, magnetic tapes, network attached storage device, etc. The storage device (103) has a host interface (105) that implements communications with the host (101) using the communication channel. For example, the communication channel between the host (101) and the storage device (103) is a PCIe bus in one embodiment; and the host (101) and the storage device (103) communicate with each other using NVMe protocol.

In some implementations, the communication channel between the host (101) and the storage device (103) includes a computer network, such as a local area network, a wireless local area network, a wireless personal area network, a cellular communications network, a broadband high-speed always-connected wireless communication connection (e.g., a current or future generation of mobile network link); and the host (101) and the storage device (103) can be configured to communicate with each other using data storage management and usage commands similar to those in NVMe protocol.

The storage device (103) has a controller (107) that runs firmware (104) to perform operations responsive to the communications from the host (101). Firmware in general is a type of computer program that provides control, monitoring and data manipulation of engineered computing devices. In FIG. 1, the firmware (104) controls the operations of the controller (107) in operating the storage device (103), such as the allocation of namespaces for storing and accessing data in the storage device (103), as further discussed below.

The storage device (103) has non-volatile storage media (109), such as magnetic material coated on rigid disks, and memory cells in an integrated circuit. The storage media (109) is non-volatile in that no power is required to maintain the data/information stored in the non-volatile storage media (109), which data/information can be retrieved after the non-volatile storage media (109) is powered off and then powered on again. The memory cells may be implemented using various memory/storage technologies, such as NAND gate based flash memory, phase-change memory (PCM), magnetic memory (MRAM), resistive random-access memory, and 3D XPoint, such that the storage media (109) is non-volatile and can retain data stored therein without power for days, months, and/or years.

The storage device (103) includes volatile Dynamic Random-Access Memory (DRAM) (106) for the storage of run-time data and instructions used by the controller (107) to improve the computation performance of the controller (107) and/or provide buffers for data transferred between the host (101) and the non-volatile storage media (109). DRAM (106) is volatile in that it requires power to maintain the data/information stored therein, which data/information is lost immediately or rapidly when the power is interrupted.

Volatile DRAM (106) typically has less latency than non-volatile storage media (109), but loses its data quickly when power is removed. Thus, it is advantageous to use the volatile DRAM (106) to temporarily store instructions and data used for the controller (107) in its current computing task to improve performance. In some instances, the volatile DRAM (106) is replaced with volatile Static Random-Access Memory (SRAM) that uses less power than DRAM in some applications. When the non-volatile storage media (109) has data access performance (e.g., in latency, read/write speed) comparable to volatile DRAM (106), the volatile DRAM (106) can be eliminated; and the controller (107) can perform computing by operating on the non-volatile storage media (109) for instructions and data instead of operating on the volatile DRAM (106).

For example, cross point storage and memory devices (e.g., 3D XPoint memory) have data access performance comparable to volatile DRAM (106). A cross point memory device uses transistor-less memory elements, each of which has a memory cell and a selector that are stacked together as a column. Memory element columns are connected via two perpendicular lays of wires, where one lay is above the memory element columns and the other lay below the memory element columns. Each memory element can be individually selected at a cross point of one wire on each of the two layers. Cross point memory devices are fast and non-volatile and can be used as a unified memory pool for processing and storage.

In some instances, the controller (107) has in-processor cache memory with data access performance that is better than the volatile DRAM (106) and/or the non-volatile storage media (109). Thus, it is preferred to cache parts of instructions and data used in the current computing task in the in-processor cache memory of the controller (107) during the computing operations of the controller (107). In some instances, the controller (107) has multiple processors, each having its own in-processor cache memory.

Optionally, the controller (107) performs data intensive, in-memory processing using data and/or instructions organized in the storage device (103). For example, in response to a request from the host (101), the controller (107) performs a real time analysis of a set of data stored in the storage device (103) and communicates a reduced data set to the host (101) as a response. For example, in some applications, the storage device (103) is connected to real time sensors to store sensor inputs; and the processors of the controller (107) are configured to perform machine learning and/or pattern recognition based on the sensor inputs to support an artificial intelligence (AI) system that is implemented at least in part via the storage device (103) and/or the host (101).

In some implementations, the processors of the controller (107) are integrated with memory (e.g., 106 or 109) in computer chip fabrication to enable processing in memory and thus overcome the von Neumann bottleneck that limits computing performance as a result of a limit in throughput caused by latency in data moves between a processor and memory configured separately according to the von Neumann architecture. The integration of processing and memory increases processing speed and memory transfer rate, and decreases latency and power usage.

The storage device (103) can be used in various computing systems, such as a cloud computing system, an edge computing system, a fog computing system, and/or a stand-alone computer. In a cloud computing system, remote computer servers are connected in a network to store, manage, and process data. An edge computing system optimizes cloud computing by performing data processing at the edge of the computer network that is close to the data source and thus reduces data communications with a centralize server and/or data storage. A fog computing system uses one or more end-user devices or near-user edge devices to store data and thus reduces or eliminates the need to store the data in a centralized data warehouse.

At least some embodiments of the inventions disclosed herein can be implemented using computer instructions executed by the controller (107), such as the firmware (104). In some instances, hardware circuits can be used to implement at least some of the functions of the firmware (104). The firmware (104) can be initially stored in the non-volatile storage media (109), or another non-volatile device, and loaded into the volatile DRAM (106) and/or the in-processor cache memory for execution by the controller (107).

For example, the firmware (104) can be configured to use the techniques discussed below in managing namespaces. However, the techniques discussed below are not limited to being used in the computer system of FIG. 1 and/or the examples discussed above.

Figure 2:
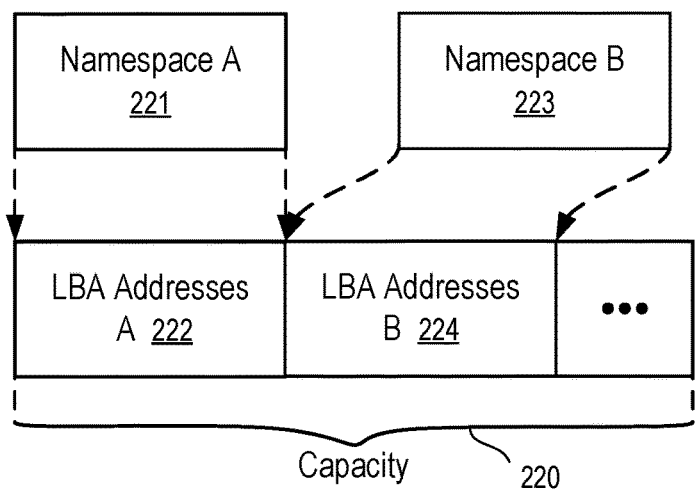
FIG. 2 illustrates an example of allocating multiple namespaces directly according to the requested sizes of the namespaces.

FIG. 2 illustrates an example of allocating multiple namespaces directly according to the requested sizes of the namespaces.

For example, the method of FIG. 2 can be implemented in the storage device (103) illustrated in FIG. 1. The non-volatile storage media (109) of the storage device (103) has memory units that may be identified by a range of LBA addresses (222, 224, . . . ), where the range corresponds to a memory capacity (220) of the non-volatile storage media (109).

In FIG. 2, namespaces (221, 223) are allocated directly from the contiguous, available region of the capacity (220). When one of the previously allocated namespaces (221, 223) is deleted, the remaining capacity (220), free for allocation to another namespace, may become fragmented, which limits the options for the selection of the size of a subsequent new namespace.

For example, when the namespace (221) illustrated in FIG. 2 is deleted and the namespace (223) remains to be allocated in a region as illustrated in FIG. 2, the free portions of the capacity (220) are fragmented, limiting the choices of the size of the subsequent new namespace to be the same as, or smaller than, the size of the namespace (221).

To improve the flexibility for dynamic namespace management and support iterations of creation and deletion of namespaces of different sizes, a block-wise mapping/allocation of logical addresses can be used, as further discussed below.

Figure 3:
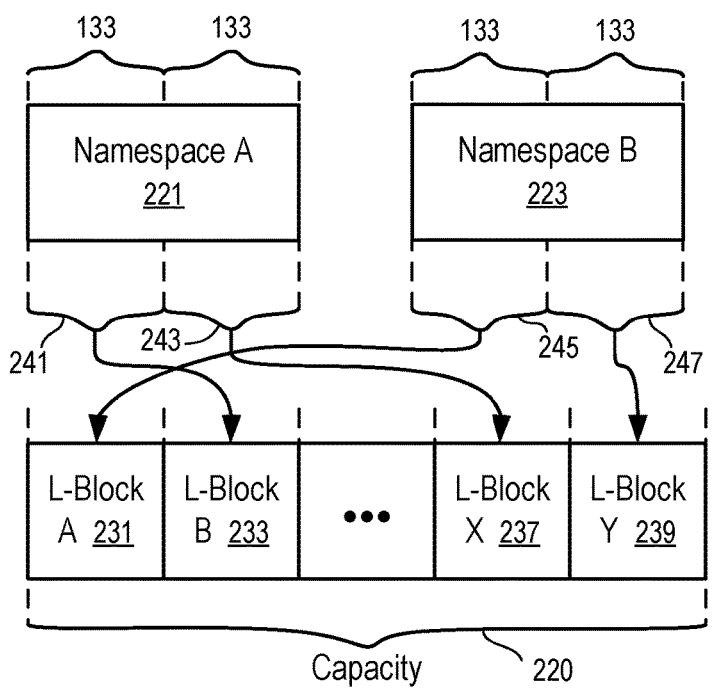
FIG. 3 illustrates an example of allocating namespaces via mapping blocks of logical addresses.

FIG. 3 illustrates an example of allocating namespaces via mapping blocks of logical addresses.

In FIG. 3, the capacity (220) of the storage device (103) is divided into L-blocks, or blocks (231, 233, . . . , 237, 239) of LBA addresses that are defined on the entire capacity of the storage device (103). To improve efficiency in address mapping, the L-blocks (231, 233, . . . , 237, 239) are designed to have the same size (133). Preferably, the block size (133) is a power of two (2), such that operations of division, modulo, and multiplication involving the block size (133) can be efficiently performed via shift operations.

After the capacity (220) is divided into L-blocks (231, 233, . . . , 237, 239) illustrated in FIG. 3, the allocation of a namespace (e.g., 221 or 223) does not have to be from a contiguous region of the capacity (220). A set of L-blocks (231, 233, . . . , 237, 239) from non-contiguous regions of the capacity (220) can be allocated from a namespace (e.g., 221 or 223). Thus, the impact of fragmentation on the size availability in creating new namespaces, which impact may result from the deletion of selected previously-created namespaces, is eliminated or reduced.

For example, non-contiguous L-blocks (233 and 237) in the capacity (220) can be allocated to contiguous regions (241 and 243) of the namespace (221) through block-wise mapping; and non-contiguous L-blocks (231 and 239) in the capacity (220) can be allocated to contiguous regions (245 and 247) of the namespace (223) via block-wise mapping.

When the block size (133) is reduced, the flexibility of the system in dynamic namespace management increases. However, a reduced block size (133) also increases the number of blocks to be mapped, which decreases the computation efficiency in address mapping. An optimal block size (133) balances the tradeoff between flexibility and efficiency; and a particular block size (133) can be selected for the specific usage of a given storage device (103) in a specific computing environment.

Figure 4:
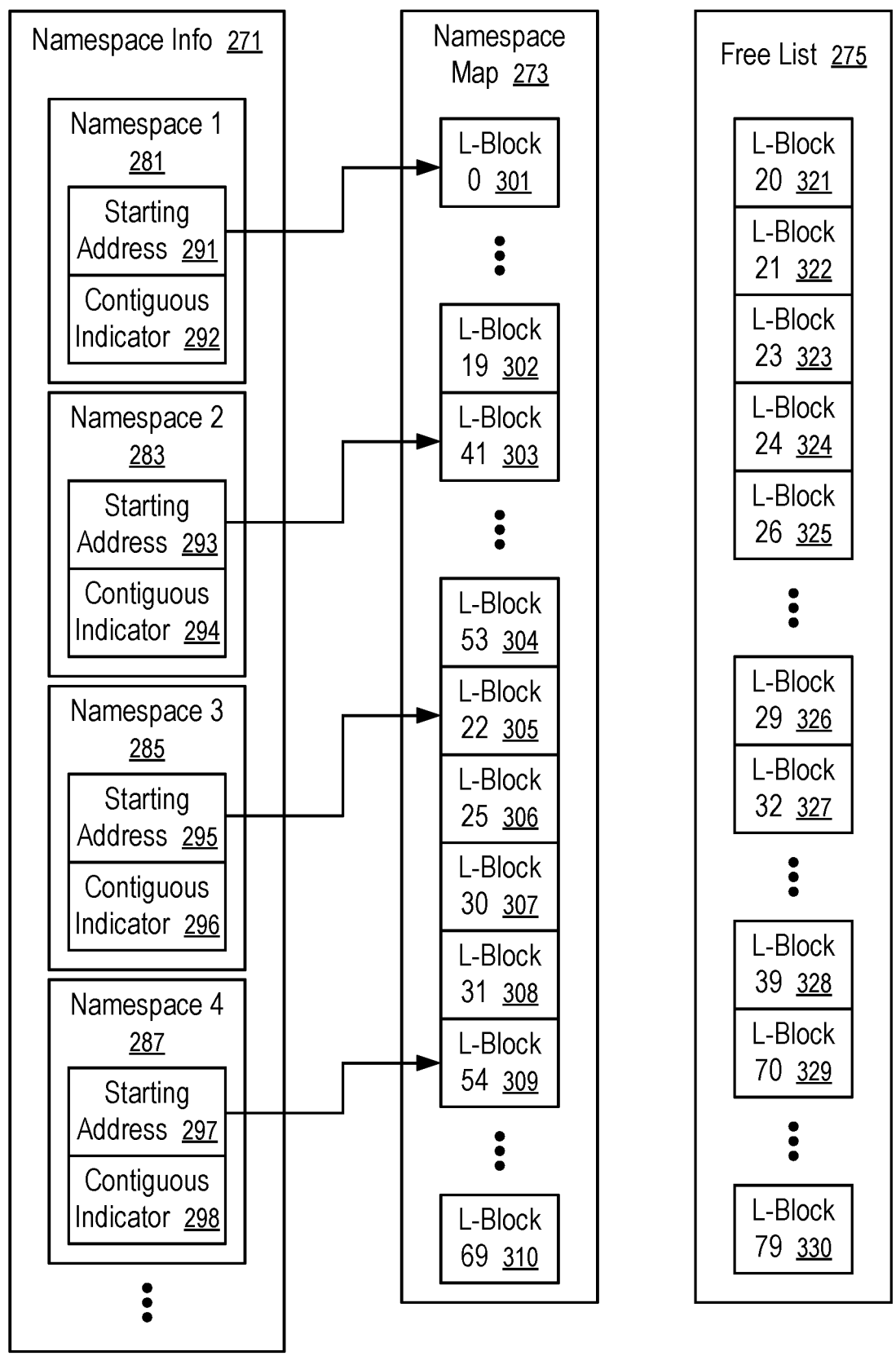
FIG. 4 illustrates an example of data structures for namespace mapping.

FIG. 4 illustrates an example of data structures for namespace mapping.

For example, the data structures for namespace mapping of FIG. 4 can be used to implement the block-wise address mapping illustrated in FIG. 3. The data structure of FIG. 4 is lean in memory footprint and optimal in computational efficiency.

In FIG. 4, a namespace map (273) stores an array of the identifications of L-blocks (e.g., 231, 233, . . . , 237, 239) that have been allocated to a set of namespaces (e.g., 221, 223) identified in namespace info (271).

In the array of the namespace map (273), the identifications of L-blocks (301, . . . , 302; 303, . . . , 304; 305, . . . 308; or 309, . . . , 310) allocated for each namespace (281, 283, 285, or 287) are stored in a contiguous region of the array. Thus, the portions of identifications of L-blocks (301, . . . , 302; 303, . . . , 304; 305, . . . 308; and 309, . . . , 310) allocated for different namespaces (281, 283, 285, and 287) can be told apart from the identification of the starting addresses (291, 293, 295, and 297) of the block identifications in the array.

Optionally, for each of the each namespaces (281, 283, 285, or 287), the namespace info (271) identifies whether or not the L-blocks (301, . . . , 302; 303, . . . , 304; 305, . . . 308; or 309, . . . , 310) allocated for the respective namespaces (281, 283, 285, or 287) is contiguous on the logical addresses in the capacity (220).

For example, when the capacity (220) is divided into 80 blocks, the L-blocks may be identified as L-blocks 0 through 79. Since contiguous blocks 0 through 19 (301 and 302) are allocated for namespace 1 (281), the contiguous indicator (292) of the namespace 1 (281) has a value indicating that the sequence of L-blocks, identified via the block identifiers starting at a starting address (291) in the array of the namespace map (273), occupy a contiguous region in the logical address space/capacity (220).

Similarly, L-blocks 41 through 53 (303 and 304) allocated for namespace 2 (283) are contiguous; and thus, a contiguous indicator (294) of the namespace 2 (283) has the value indicating that the list of L-blocks, identified via the block identifiers starting at a starting address (293) in the array of the namespace map (273), are in a contiguous region in the logical address space/capacity (220).

Similarly, L-blocks 54 through 69 (309 and 310) allocated for namespace 4 (287) are contiguous; and thus, a contiguous indicator (298) of the namespace 4 (287) has the value indicating that the list of blocks, identified via the block identifiers starting at a starting address (297) in the array of the namespace map (273) occupies a contiguous region in the logical address capacity (220). It is preferable, but not required, that the L-blocks allocated for a namespace are in a contiguous region in the mapped logical address space/capacity (220)

FIG. 4 illustrates that blocks 22, 25, 30 and 31 (305, 306, 307 and 308) allocated for namespace 3 (285) are non-contiguous; and a contiguous indicator (296) of the namespace 3 (285) has a value indicating that the list of blocks, identified via the block identifiers starting at a starting address (295) in the array of in the namespace map (273), is allocated from a non-contiguous regions in the mapped logical address space/capacity (220).

In some instances, a storage device (103) can allocate up to a predetermined number of namespaces. Null addresses can be used as starting addresses of namespaces that have not yet been allocated. Thus, the namespace info (271) has a predetermined data size that is a function of the predetermined number of namespaces allowed to be allocated on the storage device (103).

Optionally, the data structure includes a free list (275) that has an array storing the identifiers of L-blocks (321-325, . . . , 326-327, . . . , 328-329, . . . , 330) that have not yet been allocated to any of the allocated namespaces (281, 283, 285, 287) identified in the namespace info (271).

In some instances, the list of identifiers of L-blocks (321-330) in the free list (275) is appended to the end of the list of identifiers of L-blocks (301-310) that are currently allocated to the namespaces (281, 283, 285, 287) identified in the namespace info (271). A free block starting address field can be added to the namespace info (271) to identify the beginning of the list of identifiers of the L-blocks (321-330) that are in the free list (275). Thus, the namespace map (273) has an array of a predetermined size corresponding to the total number of L-blocks on the capacity (220).

Figure 5:
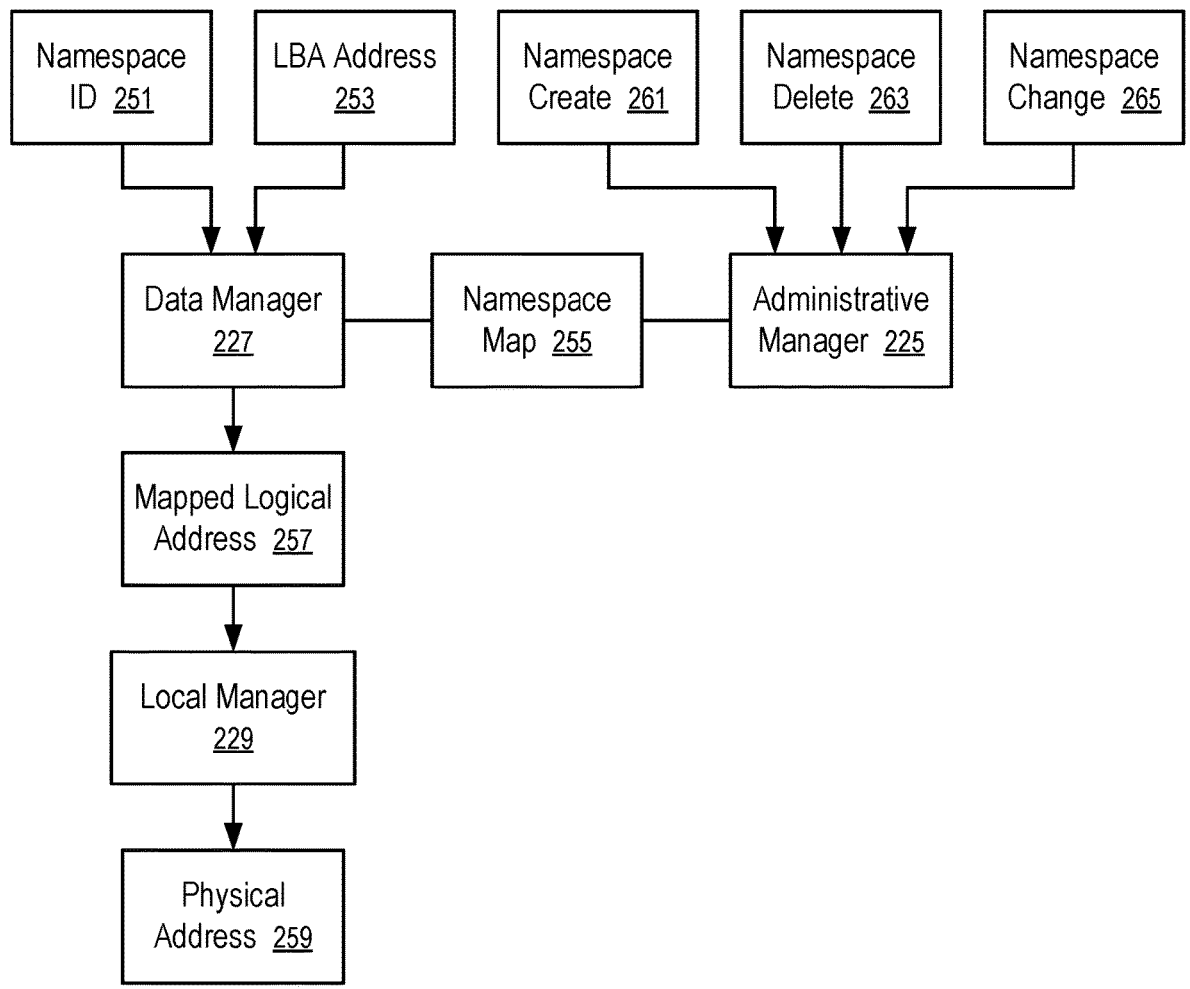
FIG. 5 shows a system to translate addresses in a non-volatile memory device to support namespace management.

FIG. 5 shows a system to translate addresses in a non-volatile memory device to support namespace management. For example, the system of FIG. 5 can be implemented using a storage device (103) illustrated in FIG. 1, a logical address mapping technique illustrated in FIG. 3, and a data structure similar to that illustrated in FIG. 4.

In FIG. 5, an administrative manager (225), a data manager (227) (or referred to as an I/O manager), and a local manager (229) are implemented as part of the firmware (e.g., 104) of a storage device (e.g., 103 illustrated in FIG. 1).

The administrative manager (225) receives commands (e.g., 261, 263, 265) from the host (e.g., 101 in FIG. 1) to create (261), delete (263), or change (265) a namespace (e.g., 221 or 223). In response, the administrative manager (225) generates/updates a namespace map (255), such as the namespace map (273) to implement the mapping illustrated in FIG. 2 or 9. A namespace (e.g., 221 or 223) may be changed to expand or shrink its size (e.g., by allocating more blocks for the namespace, or returning some of its blocks to the pool of free blocks).

The data manager (227) receives data access commands. A data access request (e.g., read, write) from the host (e.g., 101 in FIG. 1) identifies a namespace ID (251) and an LBA address (253) in the namespace ID (251) to read, write, or erase data from a memory unit identified by the namespace ID (251) and the LBA address (253). Using the namespace map (255), the data manager (227) converts the combination of the namespace ID (251) and the LBA address (253) to a mapped logical address (257) in the corresponding L-block (e.g., 231, 233, . . . , 237, 239).

The local manager (229) translates the mapped logical address (257) to a physical address (259). The logical addresses in the L-block (e.g., 231, 233, . . . , 237, 239) can be mapped to the physical addresses (259) in the storage media (e.g., 109 in FIG. 1), as if the mapped logical addresses (257) were virtually allocated to a virtual namespace that covers the entire non-volatile storage media (109).

Thus, the namespace map (255) can be seen to function as a block-wise map of logical addresses defined in a current set of namespaces (221, 223) created/allocated on the storage device (103) to the mapped logical addresses (257) defined on the virtual namespace. Since the virtual namespace does not change when the current allocation of the current set of namespaces (221, 223) changes, the details of the current namespaces (221, 223) are completely shielded from the local manager (229) in translating the mapped logical addresses (e.g., 257) to physical addresses (e.g., 259).

Preferably, the implementation of the namespace map (255) is lean in memory footprint and optimal in computational efficiency (e.g., using a data structure like the one illustrated in FIG. 4).

In some instances, the storage device (103) may not have a storage capacity (220) that is a multiple of a desirable block size (133). Further, a requested namespace size may not be a multiple of the desirable block size (133). The administrative manager (225) may detect the misalignment of the desirable block size (133) with the storage capacity (220) and/or the misalignment of a requested namespace size with the desirable block size (133), causing a user to adjust the desirable block size (133) and/or the requested namespace size. Alternatively or in combination, the administrative manager (225) may allocate a full block to a portion of a misaligned namespace and/or not use a remaining part of the allocated full block.

Figure 6:
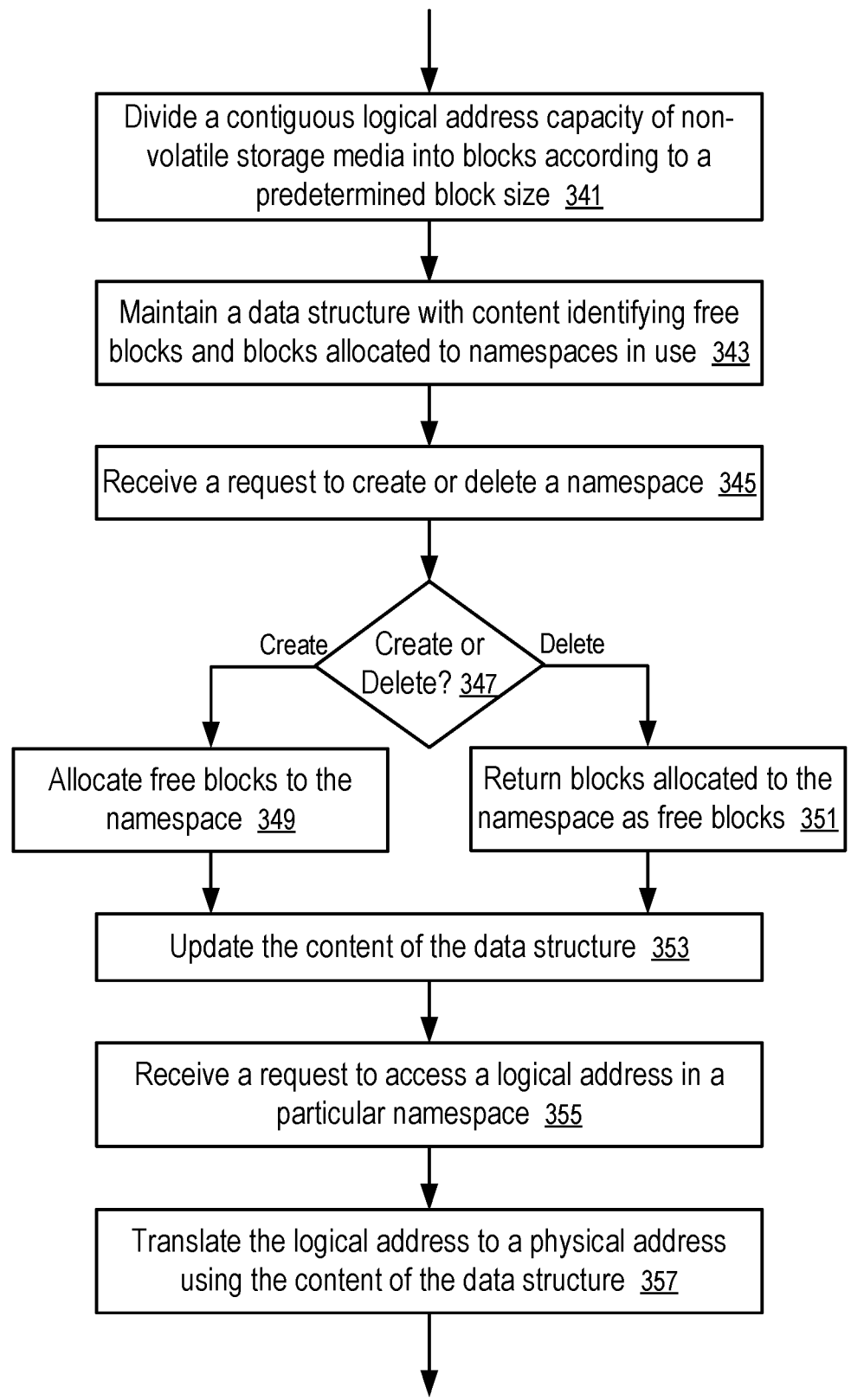
FIG. 6 shows a method to manage namespaces based on blocks of logical addresses.

FIG. 6 shows a method to manage namespaces based on blocks of logical addresses. For example, the method of FIG. 6 can be implemented in a storage device (103) illustrated in FIG. 1 using L-block techniques discussed above in connection with FIGS. 3-6.

In FIG. 6, the method includes: dividing (341) a contiguous logical address capacity (220) of non-volatile storage media (e.g., 109) into blocks (e.g., 231, 233, . . . , 237, 239) according to a predetermined block size (133) and maintaining (343) a data structure (e.g., illustrated in FIG. 4) with content identifying free blocks (e.g., 312-330) and blocks (e.g., 301-310) allocated to namespaces (281-285) in use.

In response to receiving (345) a request that is determined (347) to create a new namespace, the method further includes allocating (349) a number of free blocks to the namespace.

In response to receiving (345) a request that is determined (347) to delete an existing namespace, the method further includes returning (351) the blocks previously allocated to the namespace to the free block list (275) as free blocks.

In response to the request to create or delete a namespace, the method further includes updating (353) the content of the data structure to identify the currently available free blocks (e.g., 312-330) and blocks (e.g., 301-310) allocated to currently existing namespaces (281-285).

In response to receiving (355) a request to access a logical address in a particular namespace, the method further includes translating (357) the logical address to a physical address using the content of the data structure.

For example, a storage device (103) illustrated in FIG. 1 has: a host interface (105); a controller (107); non-volatile storage media (109); and firmware (104) containing instructions which, when executed by the controller (107), instruct the controller (107) to at least: store a block size (133) of logical addresses; divide a logical address capacity (220) of the non-volatile storage media (109) into L-blocks (e.g., 231, 233, . . . , 237, 239) according to the block size (133); and maintain a data structure to identify: a free subset of the L-blocks that are available for allocation to new namespaces (e.g., L-blocks 312-330); and an allocated subset of the L-blocks that have been allocated to existing namespaces (e.g., L-blocks 301-310). Preferably, the block size (133) is a power of two.

For example, the computer storage device (103) may be a solid state drive that communicates with the host (101) in accordance with a Non-Volatile Memory Host Controller Interface Specification (NVMHCI) for namespace management and/or access.

After the host interface (105) receives a request from a host (101) to allocate a particular namespace (221) of a quantity of non-volatile memory, the controller (107), executing the firmware (104), allocates a set of blocks (233 and 237) from the free subset to the particular namespace (221) and updates the content of the data structure. The set of blocks (233 and 237) allocated to the particular namespace (221) do not have to be contiguous in the logical address capacity (220), which improves the flexibility for dynamic namespace management.

Using the content of the data structure, the controller (107) executing the firmware (104) translates logical addresses defined in the first namespace the mapped logical addresses (257) and then to physical addresses (259) for the non-volatile storage media (109).

After the host interface (105) receives a request from the host (101) to delete (263) a particular namespace (221), the controller (107), executing the firmware (104), updates the content of the data structure to return the set of blocks (233 and 237) allocated to the particular namespace (221) from the allocated subset (e.g., 273) in the data structure to the free subset (e.g., 275) in the data structure.

Preferably, the data structure includes an array of identifications of blocks (301-310) in the allocated subset and pointers (291, 293, 295, 297) to portions (301-302, 303-304, 305-308, 309-310) of the array containing corresponding sets of identifications of blocks (301-310) that are allocated to respective ones of the existing namespaces (281, 283, 285, 287).

Optionally, the data structure further includes a set of indicators (292, 294, 296, 298) for the respective ones of the existing namespaces (281, 283, 285, 287), where each of the indicators (292, 294, 296, 298) indicating whether or not a respective set of identifications of blocks (301-302, 303-304, 305-308, 209-310) allocated to a corresponding one of the existing namespaces (281, 283, 285, 287) is contiguous in the logical address capacity (220) or space.

Optionally, the data structure includes an array of identifications of free blocks (321-330) in the free subset.

The logical address capacity (220) does not have to be a multiple of the block size (133). When the logical address capacity (220) is not a multiple of the block size (133), an L-block (e.g., 239) that is insufficient to be a full-size block may be not used.

The quantity of non-volatile memory requested for the creation (261) of a namespace (e.g., 221) does not have to be a multiple of the block size (133). When the quantity is not a multiple of the block size (133), one of the full blocks allocated to the namespace may not be fully utilized.

A non-transitory computer storage medium can be used to store instructions of the firmware (104). When the instructions are executed by the controller (107) of the computer storage device (103), the instructions cause the controller (107) to perform a method discussed above.

In this description, various functions and operations may be described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor or microcontroller, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects.

A tangible, non-transitory computer storage medium can be used to store software and data which, when executed by a data processing system, causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer-to-peer networks.

Different portions of the data and instructions can be obtained from different centralized servers and/or peer-to-peer networks at different times and in different communication sessions or in a same communication session. The data and instructions can be obtained in their entirety prior to the execution of the applications. Alternatively, portions of the data and instructions can be obtained dynamically, just in time, when needed for execution. Thus, it is not required that the data and instructions be on a machine-readable medium in their entirety at a particular instance of time.

Examples of computer-readable storage media include, but are not limited to, recordable and non-recordable type media such as volatile and non-volatile memory devices, read only memory (ROM), random access memory (RAM), flash memory devices, floppy and other removable disks, magnetic disk storage media, and optical storage media (e.g., Compact Disk Read-Only Memory (CD ROM), Digital Versatile Disks (DVDs), etc.), among others. The instructions may be embodied in a transitory medium, such as electrical, optical, acoustical or other forms of propagated signals, such as carrier waves, infrared signals, digital signals, etc. A transitory medium is typically used to transmit instructions, but not viewed as capable of storing the instructions.

In various embodiments, hardwired circuitry may be used in combination with software instructions to implement the techniques. Thus, the techniques are neither limited to any specific combination of hardware circuitry and software, nor to any particular source for the instructions executed by the data processing system.

Although some of the drawings illustrate a number of operations in a particular order, operations that are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

The above description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A computer storage device, comprising:
   a host interface;
   a controller;
   non-volatile storage media having a logical address capacity divided into blocks according to a block size; and
   firmware containing instructions which, when executed by the controller, instruct the controller to at least:
      maintain a data structure to identify:
         a first subset of the blocks that are available for allocation to new namespaces; and
         a second subset of the blocks that have been allocated to existing namespaces, wherein the data structure includes a set of indicators for respective namespaces among the existing namespaces, each of the indicators indicating whether or not a respective set of identifications of blocks allocated to a corresponding namespace among the existing namespaces is contiguous in the logical address capacity; and
      translate logical addresses in the existing namespaces into physical addresses for the non-volatile storage media using content of the data structure.

2. The computer storage device of claim 1, wherein:
   the instructions which, when executed by the controller, further instruct the controller to at least:
      receive, via the host interface, a request from a host to allocate a first namespace of a quantity of non-volatile memory;
      allocate, in response to the request, a first set of blocks from the first subset to the first namespace;
      update the content of the data structure in response to the first set of blocks being allocated to the first namespace; and
      translate logical addresses in the first namespace to physical addresses for the non-volatile storage media using the content of the data structure.

3. The computer storage device of claim 2, wherein the instructions which, when executed by the controller, further instruct the controller to:
   receive, via the host interface, a request from the host to delete the first namespace;
   update the content of the data structure to return the first set of blocks from the second subset in the data structure to the first subset in the data structure.

4. The computer storage device of claim 2, wherein the data structure includes an array of identifications of blocks in the first subset.

5. The computer storage device of claim 2, wherein the first set of blocks are not contiguous in the logical address capacity.

6. The computer storage device of claim 5, wherein the block size is a power of two.

7. The computer storage device of claim 2, wherein the quantity of non-volatile memory requested for the first namespace is not a multiple of the block size.

8. The computer storage device of claim 2, wherein the request to allocate the namespace is in accordance with a Non-Volatile Memory Host Controller Interface Specification.

9. The computer storage device of claim 2, wherein the computer storage device is a solid state drive.

10. The computer storage device of claim 1, wherein the data structure identifies the first subset and the second subset using a first array of identifiers of blocks in the first subset and a second array of identifiers of blocks in the second subset.

11. The computer storage device of claim 10, wherein the data structure further includes, for each respective namespace in the existing namespaces, a starting location in the second array for the respective namespace.

12. A method implemented in a computer storage device, the method comprising:
   maintaining, based on a predetermined block size used to divide a logical address capacity of non-volatile storage media of the computer storage device into blocks, a data structure to identify:

a first subset of the blocks that are available for allocation to new namespaces; and a second subset of the blocks that have been allocated to existing namespaces, wherein the data structure identifies the first subset and the second subset using a first array of identifiers of blocks in the first subset and a second array of identifiers of blocks in the second subset; and translating logical addresses in the existing namespaces into physical addresses for the non-volatile storage media using content of the data structure.

13. The method of claim 12, wherein the data structure further includes, for each respective namespace in the existing namespaces, a starting location in the second array for the respective namespace.

14. The method of claim 12, further comprising:

receiving, via a host interface of the computer storage device, a request from a host to allocate a first namespace of a quantity of non-volatile memory;

allocating, in response to the request, a first set of blocks from the first subset to the first namespace;

updating the content of the data structure in response to the first set of blocks being allocated to the first namespace; and translating logical addresses in the first namespace to physical addresses for the non-volatile storage media using the content of the data structure.

15. The method of claim 14, wherein the instructions which, when executed by the controller, further instruct the controller to:

receive, via the host interface, a request from the host to delete the first namespace;

update the data structure to return the first set of blocks from the second subset in the data structure to the first subset in the data structure.

16. The method of claim 12, wherein the data structure includes a set of indicators for respective namespaces among the existing namespaces, each of the indicators indicating whether or not a respective set of identifications of blocks allocated to a corresponding namespace among the existing namespaces is contiguous in the logical address capacity.

17. A non-transitory computer storage medium storing instructions which, when executed by a controller of a computer storage device, cause the controller to perform a method, the method comprising:

maintaining, based on a predetermined block size used to divide a logical address capacity of non-volatile storage media of the computer storage device into blocks, a data structure having content identifying:

a first subset of the blocks that are available for allocation to new namespaces; and a second subset of the blocks that have been allocated to existing namespaces, wherein the data structure identifies the first subset and the second subset using a first array of identifiers of blocks in the first subset and a second array of identifiers of blocks in the second subset; and translating logical addresses in the existing namespaces into physical addresses for the non-volatile storage media using the content of the data structure.

18. The non-transitory computer storage medium of claim 17, wherein the method further comprises:

receiving, via a host interface of the computer storage device, a request from a host to allocate a first namespace of a quantity of non-volatile memory;

allocating, in response to the request, a first set of blocks from the first subset to the first namespace;

updating the content of the data structure in response to the first set of blocks being allocated to the first namespace; and translating logical addresses in the first namespace to physical addresses for the non-volatile storage media using the content of the data structure.

19. The non-transitory computer storage medium of claim 18, wherein the block size is a power of two; and the first set of blocks are not contiguous in the logical address capacity.

20. The non-transitory computer storage medium of claim 17, wherein the data structure includes a set of indicators for respective namespaces among the existing namespaces, each of the indicators indicating whether or not a respective set of identifications of blocks allocated to a corresponding namespace among the existing namespaces is contiguous in the logical address capacity.

* * * * *